(12) United States Patent
Gibbons

(10) Patent No.: US 7,658,405 B2
(45) Date of Patent: Feb. 9, 2010

(54) APPARATUS AND METHOD FOR PROVIDING EXTENDED INFLATOR OUTPUT

(75) Inventor: Patrick J Gibbons, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 269 days.

(21) Appl. No.: 11/461,106

(22) Filed: Jul. 31, 2006

(65) Prior Publication Data

US 2008/0023947 A1    Jan. 31, 2008

(51) Int. Cl.
*B60R 21/16* (2006.01)
*F16K 21/04* (2006.01)
*F16K 17/04* (2006.01)
*F16K 15/00* (2006.01)

(52) U.S. Cl. .................. 280/736; 280/737; 280/742; 280/741; 137/541; 137/543.17; 137/513.3; 137/513.5

(58) Field of Classification Search ................ 280/737, 280/742, 736, 741; 137/68.25, 71, 68.13, 137/73, 541, 543.17, 513.3, 513.5
See application file for complete search history.

(56) References Cited

U.S. PATENT DOCUMENTS

| | | | | |
|---|---|---|---|---|
| 2,784,737 | A | * | 3/1957 | Kelly .................. 137/540.11 |
| 5,580,086 | A | * | 12/1996 | McAlister .................. 280/737 |
| 5,609,359 | A | * | 3/1997 | Johnson et al. .............. 280/736 |
| 5,639,117 | A | * | 6/1997 | Mandzy et al. ............. 280/741 |
| 5,695,216 | A | * | 12/1997 | Sandstrom et al. .......... 280/737 |
| 5,851,029 | A | * | 12/1998 | Klinger et al. .............. 280/736 |
| 6,692,022 | B2 | | 2/2004 | Schenck et al. |
| 6,764,097 | B2 | * | 7/2004 | Kelley et al. ................ 280/737 |
| 6,799,777 | B2 | | 10/2004 | Hawthorn et al. |
| 6,918,611 | B1 | | 7/2005 | Winters et al. |
| 6,929,023 | B2 | * | 8/2005 | Whitaker et al. ....... 137/315.33 |
| 6,932,384 | B2 | | 8/2005 | Waid et al. |
| 6,971,671 | B2 | | 12/2005 | Schneider et al. |
| 7,066,201 | B2 | * | 6/2006 | Chen et al. .................. 137/541 |
| 7,174,910 | B2 | * | 2/2007 | Kayukawa ............... 137/234.5 |
| 7,413,221 | B2 | * | 8/2008 | Zeng et al. .................. 280/742 |

* cited by examiner

*Primary Examiner*—Paul N Dickson
*Assistant Examiner*—Nicole Verley
(74) *Attorney, Agent, or Firm*—Thomas N. Twomey

(57) ABSTRACT

A variable venting assembly for an inflator, the assembly comprising: a nozzle having an inlet opening and an outlet opening; a valve member movably mounted to the nozzle for movement between an open position and a closed position, the valve member having a shaft member and a head portion secured to the shaft member, the head portion being configured to seal the outlet opening when the valve member is in the closed position; a biasing member located between a portion of the nozzle and a surface of the shaft member, the biasing member providing a biasing force to maintain the valve member in the closed position; and a bleed orifice providing a fluid path through the nozzle, the bleed orifice providing the fluid path regardless of the position of the valve member.

23 Claims, 3 Drawing Sheets

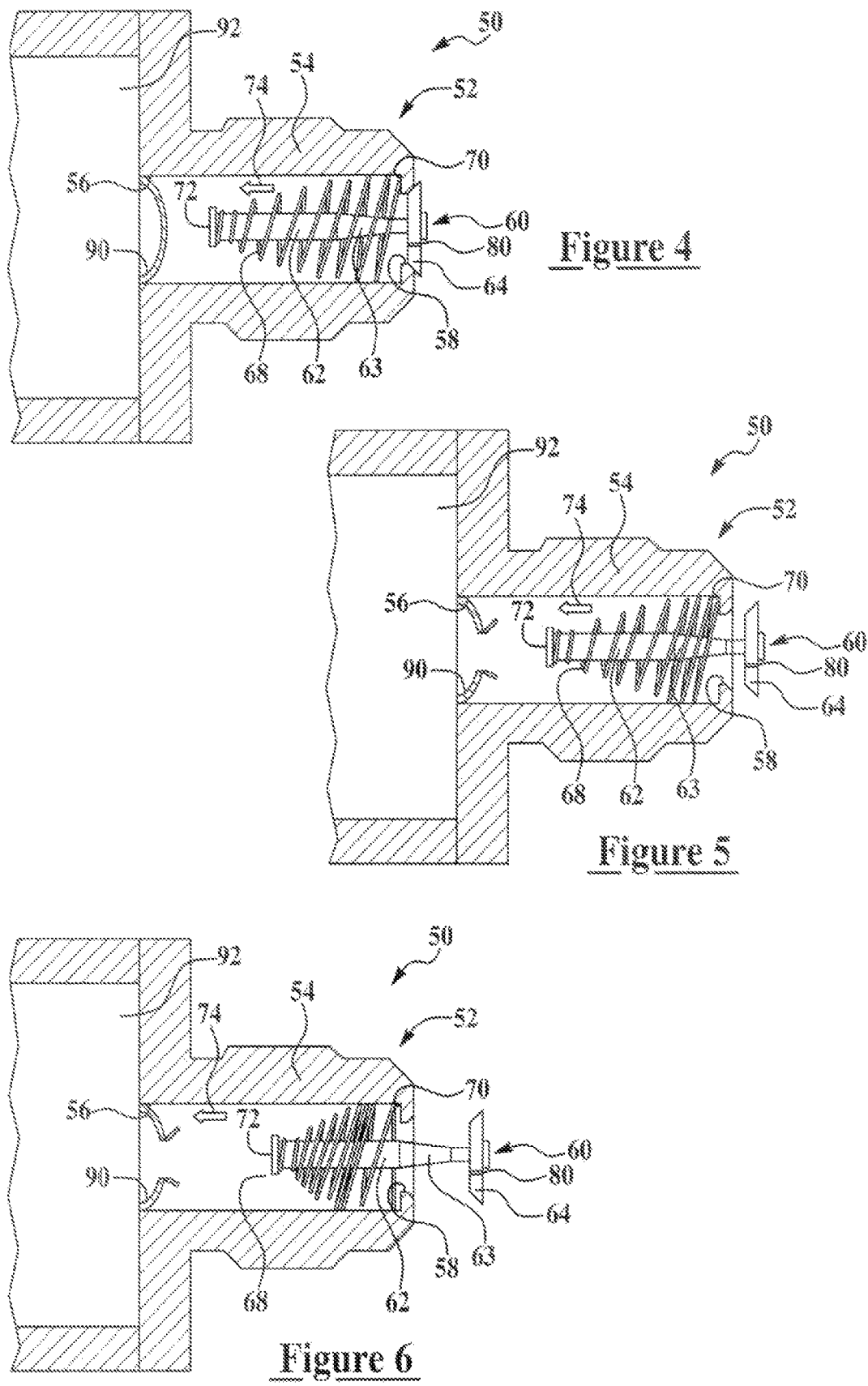

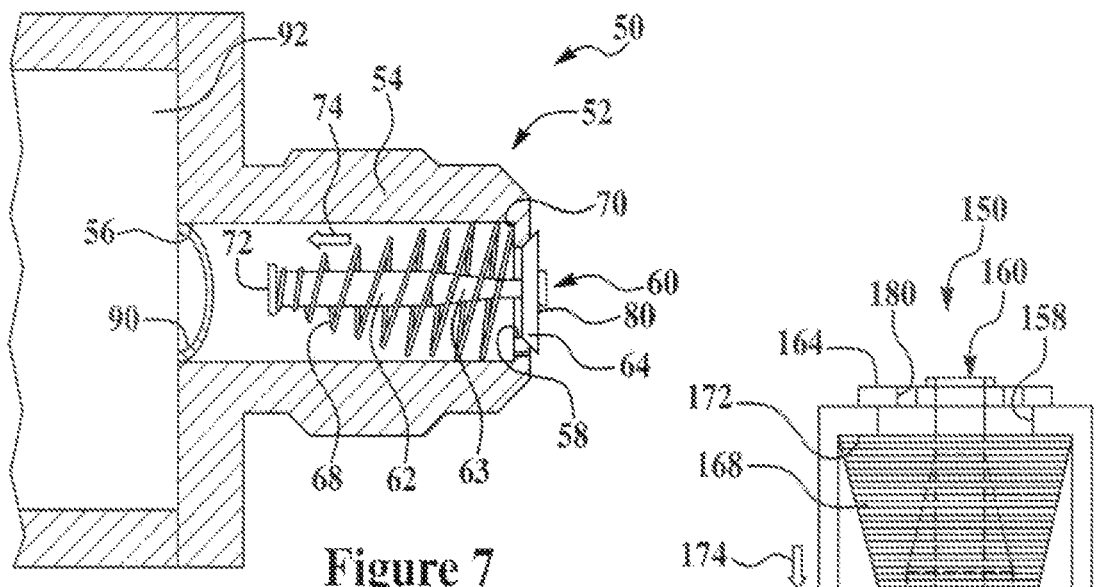
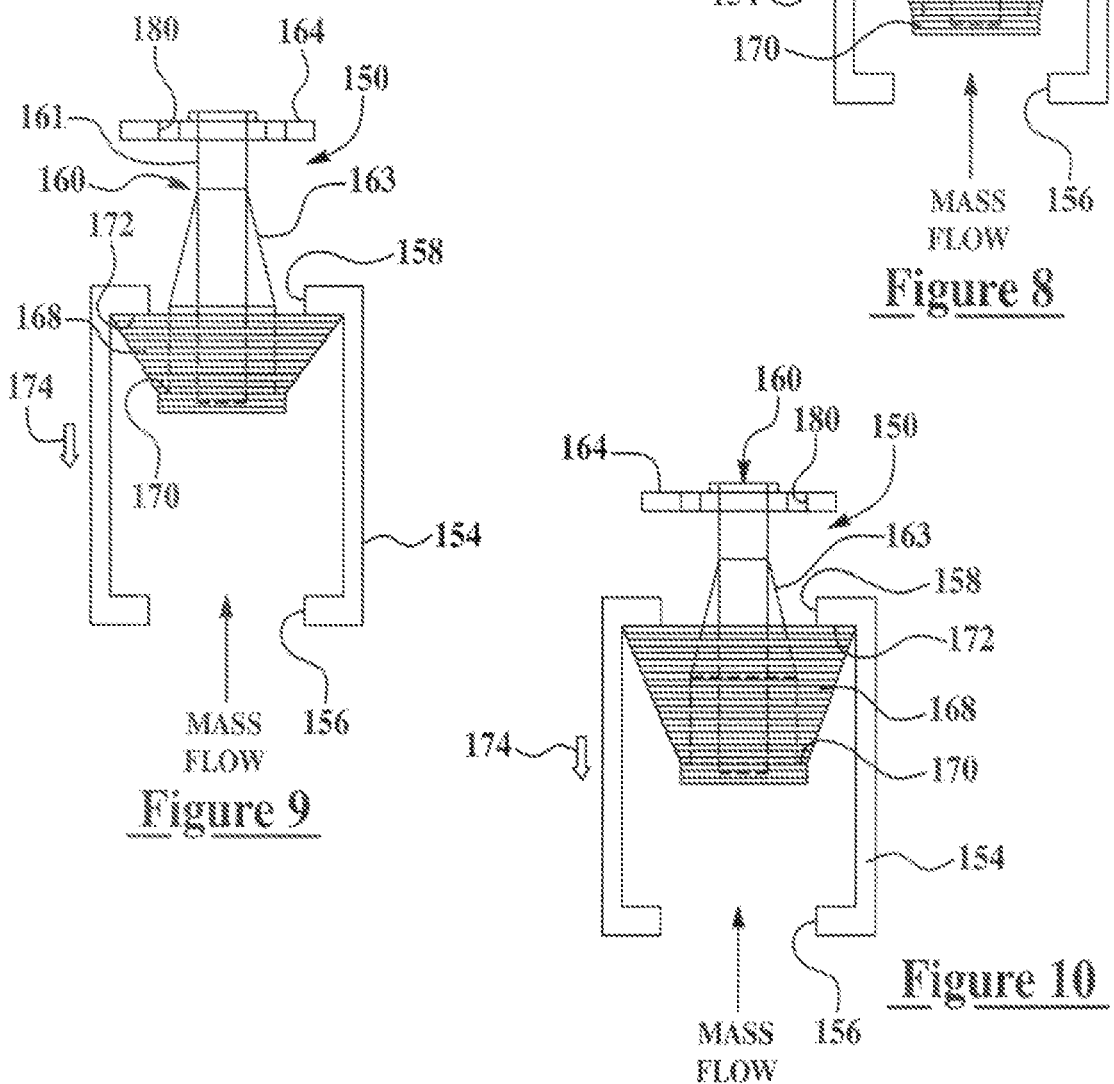

APPARATUS AND METHOD FOR PROVIDING EXTENDED INFLATOR OUTPUT

CROSS REFERENCE TO RELATED APPLICATIONS

The present invention relates to the following applications: Extended Output Inflator Device, Ser. No. 11/461,285; and Apparatus and Method for Providing Extended Inflator Output, Ser. No. 11/461,332 filed contemporaneously herewith, the contents each of which are incorporated herein by reference thereto.

TECHNICAL FIELD

The present invention relates to air bag devices. More particularly, the present invention relates to an apparatus and method for providing extended inflator output.

BACKGROUND

Today some vehicles are supplied with side air bag modules. A side air bag module comprises inflatable cushions or curtains that traverse a side portion of the vehicle when they are deployed in accordance with a predetermined activation event. Generally, the device is located along a side of the vehicle in an un-inflated state and upon activation deploys an inflatable curtain along a side portion of the vehicle. Side impact air bags or inflatable cushions are often mounted in close proximity to the vehicle's roof rail, doorframe or center pillars, or in some instances within the side door. Accordingly, the space or housing for the un-inflated air bag is compact and extends along or traverses the window area or frame, as the air bag cannot be installed in the areas comprising the windows. Moreover, it is also desirable to have the inflatable cushion disposed behind a decorative trim portion of the vehicle's interior. Thus, the presence of the side air bag device is not observable to occupants when it is in its un-deployed state.

Substantial efforts have been directed to developing inflatable cushions or curtains having extended periods of inflation, or in other words inflatable cushions that will retain their inflation gases for a period of time after inflation. Some methods for providing this extended period of inflation are to minimize the inflation gas leakage either by providing a one-piece-woven curtain air bag or by applying a sealant at the seams where the two sides of an inflatable cushion are sealed together. However, both of these methods are costly as they add additional manufacturing steps and methods.

Accordingly, it is desirable to provide an air bag module capable of providing an inflatable cushion or curtain with an extended period of inflation.

SUMMARY OF THE INVENTION

This disclosure relates to an apparatus and method for providing variable discharge of inflation gases employed for inflating an inflatable cushion.

A variable venting assembly for an inflator is provided. The assembly comprises: a nozzle having an inlet opening and an outlet opening and a valve member movably mounted to the nozzle for movement between an open position and a closed position. The valve member has a shaft member and a head portion secured to the shaft member, the head portion being configured to seal the outlet opening when the valve member is in the closed position. A biasing member is located between a portion of the nozzle and a surface of the shaft member, the biasing member providing a biasing force to maintain the valve member in the closed position; and a bleed orifice provides a fluid path through the nozzle, the bleed orifice providing the fluid path regardless of the position of the valve member.

An inflator for an air bag module is also provided, comprising: a housing defining a chamber for receiving a pressurized gas; a variable venting assembly for releasing the pressurized gas from the housing, the variable venting assembly comprising: a nozzle having an inlet opening and an outlet opening; a valve member movably mounted to the nozzle for movement between an open position and a closed position. The valve member has a shaft member and a head portion secured to the shaft member, the head portion being configured to seal the outlet opening when the valve member is in the closed position. The variable venting assembly further comprises: a biasing member located between a portion of the nozzle and a surface of the shaft member, the biasing member providing a biasing force to maintain the valve member in the closed position; and a bleed orifice providing a fluid path through the nozzle, the bleed orifice providing the fluid path regardless of the position of the valve member. The inflator further comprises a removable sealing member disposed between the chamber and the inlet opening; and an initiator for removing the removable sealing member, wherein the pressurized gas moves the valve member from the closed position towards the open position.

A method for providing an extended inflation force to an inflatable cushion of an air bag module is also disclosed, the method comprising: releasing a pressurized gas from a housing of an inflator with a variable venting assembly to inflate the inflatable cushion, the variable venting assembly releasing the pressurized gas at a first flow rate until a biasing force of a biasing member closes a valve member movably mounted to a nozzle of the inflator; and maintaining an inflation level of the inflatable cushion by providing a flow of inflation gas through a bleed orifice when the biasing member closes the valve member.

BRIEF DESCRIPTION OF THE DRAWINGS

FIG. 4 is a cross sectional schematic illustration of a venting assembly constructed in accordance with an exemplary embodiment of the present invention;

FIGS. 5 and 6 are cross sectional schematic illustrations of operation positions of the venting assembly of FIG. 4;

FIG. 7 is cross sectional a schematic illustration of a venting assembly constructed in accordance with an alternative exemplary embodiment of the present invention; and FIGS. 8-10 are cross sectional schematic illustrations of operational positions of a venting assembly constructed in accordance with another alternative exemplary embodiment of the present invention.

DETAILED DESCRIPTION OF EXEMPLARY EMBODIMENTS

The disclosure of the present application relates to an air bag module. More particularly, the invention provides inflation devices, assemblies, and method of inflating an inflatable device which may supply or furnish inflation gas in a manner that will provide or result in an extended stand-up time for an associated inflatable device. In addition, exemplary embodiments are directed to apparatus and method to provide such inflation devices, which are less expensive to manufacture than other methods and apparatus for providing coverage to vehicles having different configurations.

This application relates to methods and apparatus for providing extended inflator output in vehicle air bag systems. More particularly, exemplary embodiments are directed to an apparatus that is configured to provide an extended inflator output for use with an inflatable cushion.

Figure 1:
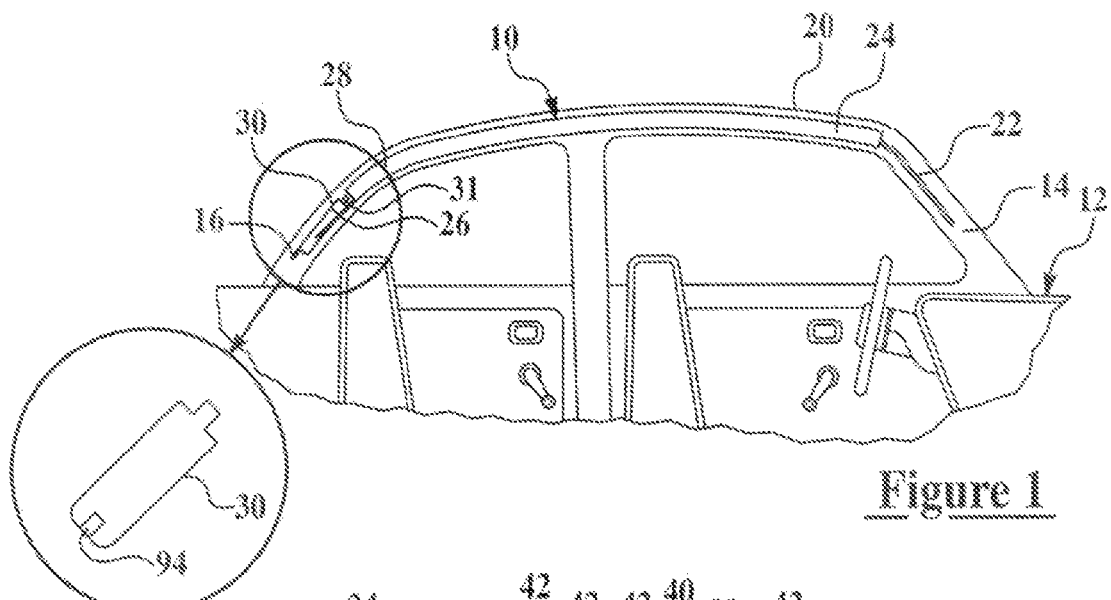
FIG. 1 is a side elevation view of an inflatable cushion in a stored position.

Referring now to FIG. 1, an inflatable cushion or air bag 10 is illustrated. Air bag 10 is manufactured and constructed in order to deploy in a variety of vehicle configurations. As discussed herein, exemplary embodiments of the present invention are related to apparatus and methods for providing extended inflator output for use with inflatable cushions. As used herein "inflatable cushions" is intended to refer to side curtain air bags, driver side air bags, passenger side air bags, etc. FIG. 1 provides a non-limiting example of an air bag or inflatable cushion 10 mounted to a vehicle 12 in a stored or non-deployed state. As illustrated, vehicle 12 comprises a front pillar 14, a rear pillar 16, and, if the vehicle is so equipped (e.g., it has more that one door per side), a center pillar or pillars 18. Such pillars are referred to by those skilled in the related arts as A, B, C and D pillars. Inflatable cushion 10 is stored and mounted on or proximate to a vehicle roof rail 20 beneath a headliner. In some applications a first tether or connecting means 22 connects a front portion 24 of the inflatable cushion to the front pillar and a second tether or connecting means 26 connects a rear portion 28 of the inflatable cushion to the rear pillar.

It is, of course, understood that depending on the application requirements or configuration of the air bag device, inflatable cushion 10 may not require connecting means 22 and 26. Thus, connecting means 22 and 26 are provided as examples and the present invention is not intended to be limited by the same.

As illustrated, the rear portion of the air bag is in fluid communication with a gas generator or inflator 30 positioned to provide an inflation gas to inflate inflatable cushion 10 via a diffuser tube 31 having a plurality of diffuser openings disclosed therein. It is, of course, understood and as applications may vary, the inflator may be positioned in other locations that those illustrated in the drawings. For example, the inflator may be located in a position farther forward in the vehicle such as the door pillar, the front pillar, or another location or locations. In addition, the diffuser tube may be configured to extend through a portion of the inflatable cushion, wherein a plurality of openings are positioned in the diffuser tube that traverses through an interior portion of the inflatable cushion. Thus, the presented location is provided as an example and the present invention is not intended to be limited by the same. In yet another alternative, the inflator may be remotely located and a conduit or other fluid providing means used to supply the inflating gas from the inflator to the inflatable cushion.

Figure 2:
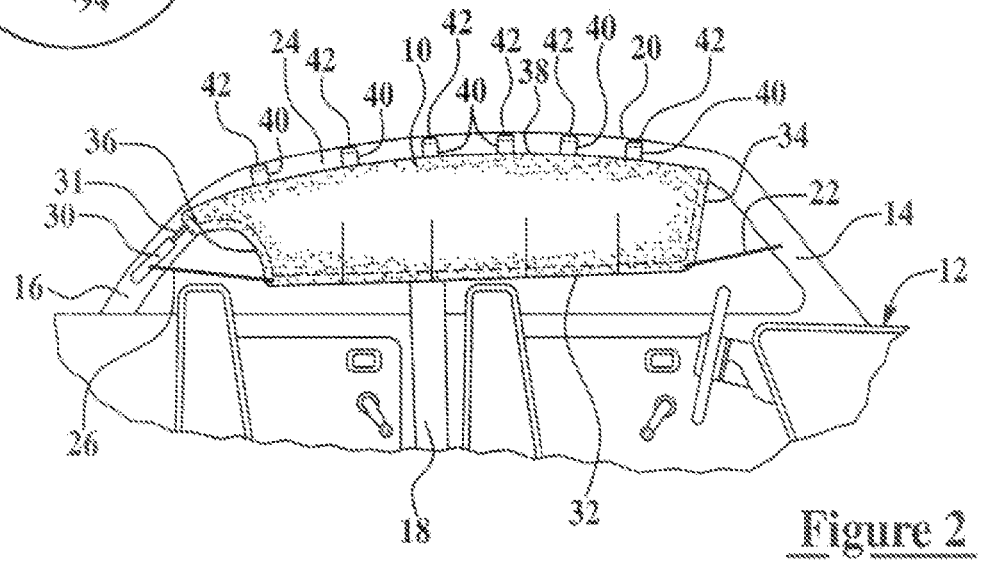
FIG. 2 is a side elevation view of an inflatable cushion in a deployed state.
Figure 3:
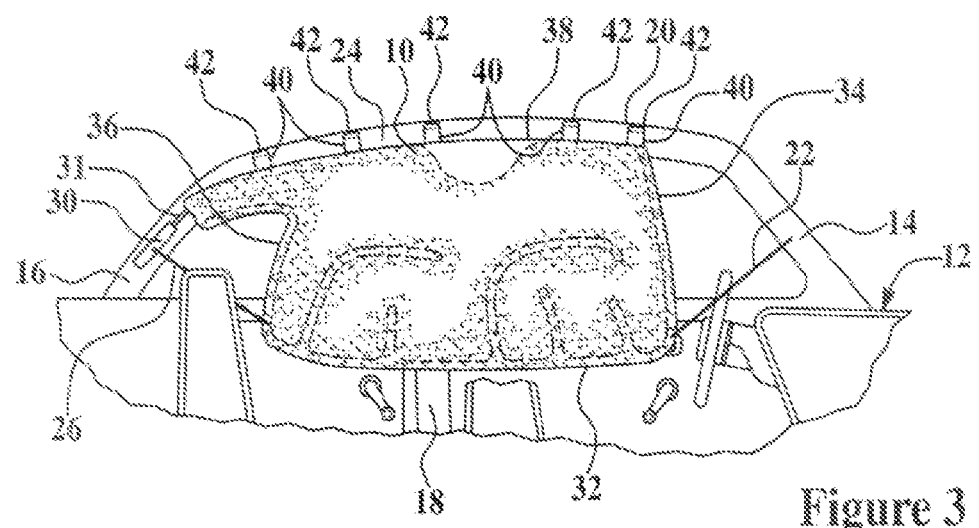
FIG. 3 is a side elevation view of another inflatable cushion in a deployed state.

FIGS. 2 and 3 illustrate inflatable cushion 10 of two different non-limiting designs in an inflated or deployed state. As illustrated in FIGS. 2 and 3, inflatable cushion 10 comprises a deploying edge 32, which comprises the bottom portion of the air bag that traverses across the window openings or window frames of the vehicle. Air bag 10 also comprises a forward edge 34, a rearward edge 36 and a fixed edge 38. Fixed edge 38 represents the portion of the air bag that remains in substantially the same position regardless of whether the air bag 10 is deployed or not.

Many different types of air bags or inflatable cushion arrangements (e.g., internal cavities, tethers or seams) are contemplated to be used with exemplary embodiments of the present invention. It is understood that the configuration of inflatable cushion 10 may vary and that the illustrations in FIGS. 1 and 2 are provided as examples. The present invention is not intended to be limited to the specific configurations provided in the figures, as they are considered ancillary to the present invention. Moreover, the present invention is contemplated for use with other vehicle configurations that those illustrated in FIGS. 1-3. For example, the vehicle may include three or more rows of seats. Such vehicles include but are not limited to sport utility vehicles, station wagons, vans or minivans. Conversely, the vehicle may comprise only a single row of seats, such vehicles including but not limited to sports coupes.

The inflatable cushion may be made of any air bag material suitable for holding gas. In an exemplary embodiment, the inflatable cushion comprises two sheets of woven nylon fabric lined with urethane or other substantially impervious material such as silicone. The two urethane coated nylon sheets are secured to one another along an outer periphery thereof to define the overall air bag shape. Prior to deployment, the inflatable cushion is stored in a compartment mounted to the roof rail 24 or proximate to the roof rail as shown in FIG. 1. In order to store the air bag into the compartment, the un-inflated air bag is folded into a configuration which allows it to occupy a small discrete area within the vehicle interior.

In accordance with an exemplary embodiment the fixed edge 38 comprises a plurality of mounting portions 40, which comprise a portion of the inflatable cushion from which fixed edge 38 depends. As illustrated, mounting portions 40 are each secured to an attachment apparatus 42, which in accordance with an exemplary embodiment is configured to slidably engage a feature (e.g., mounting surface, mounting aperture) of the vehicle surface that is configured to engage the attachment apparatus 42. Alternatively, fixed edge 38 may be configured to have attachment apparatus 42 secured thereto negating the need for mounting portions 40. In accordance with an exemplary embodiment, each apparatus 42 is fixedly secured to the air bag via any suitable method, including rivets, bolts, studs, adhesives, etc. or equivalents thereof. In one exemplary embodiment, apparatus 42 is insert molded about a portion of the inflatable cushion.

Referring now to FIGS. 4-6, a variable venting assembly 50 for use with an inflator 52 is illustrated. As illustrated, the variable venting assembly comprises a nozzle portion 54 having an inlet opening 56 and an outlet opening 58. The variable venting assembly further comprises a valve member 60 movably mounted to the nozzle for movement between an open position (FIG. 6) and a closed position (FIG. 4). As illustrated, the valve member has a shaft member 62 and a head portion 64 secured to the shaft member. In accordance with an exemplary embodiment, the head portion is configured to seal the outlet opening when the valve member is in the closed position. In one non-limiting embodiment, a circumferential edge 66 of head portion 64 may be chamfered and configured to fit against a complementary chamfered edge 67 of the outlet opening as reference in FIG. 6.

In accordance with an exemplary embodiment, a biasing member 68 is located between a portion 70 of the nozzle and a surface of an enlarged end portion 72 secured to the shaft member 62. In an exemplary embodiment, the biasing member is configured to provide a biasing force in the direction of arrow 74 in order to maintain the valve member in the closed position. In accordance with an exemplary embodiment the biasing member is a conical spring having a larger end positioned adjacent the outlet end portion of the nozzle, and a smaller end positioned adjacent end portion 72.

When the inflator disburses gas to an inflatable cushion, the biasing force of the biasing member is overcome by the force of pressurized gas pressing against valve member 60. A flow path is thereby created between outlet opening 58 and shaft member 62. In accordance with one exemplary embodiment, shaft member 62 has a tapered shaft portion 63 having varying-sized diameter for varying the size of the flow path at the nozzle outlet as the position of the valve member varies within the nozzle. Alternatively, shaft portion 63 may have a diameter size that varies by discrete steps. The shaft portion may alternatively have a constant diameter.

As illustrated in FIG. 6, and in accordance with an exemplary embodiment, the initial gas pressure is sufficient to substantially extend the valve member by pushing against the head portion. FIG. 5 illustrates that as gas pressure decreases, the valve member gradually returns to the closed position. The varying diameter of the shaft enables regulating of the gas pressure during different stages of gas disbursement through nozzle 54. For example, a narrow shaft diameter may provide a larger flow path than is provided by wider shaft diameter, enabling a greater mass flow of the inflator gas.

As gas flow decreases, the biasing force of the biasing member gradually returns the valve member to a closed position. In accordance with an exemplary embodiment, a bleed orifice 80 provides a fluid path through the nozzle, the bleed orifice providing the fluid path regardless of the position of the valve member, extending the period of inflation by permitting additional gas flow after the valve member returns to a closed position.

In accordance with an alternative exemplary embodiment, and as illustrated in FIG. 7, the bleed orifice may be located in a portion of the nozzle separate from the valve member. Though FIG. 7 illustrates the bleed orifice in a position near the outlet opening of the nozzle, those skilled in the art will recognize that the bleed orifice may be located at any position on the nozzle so long as the bleed orifice provides a fluid path to the inflatable cushion.

When a predetermined activation event or occurrence is detected, the inflatable cushion is inflated by gas from the inflator. In general, the inflator will receive an inflation signal or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the air bag module. The sensing and diagnostic module receives a plurality of signals from appropriate sensing devices (e.g., door mounted accelerometers), and will generate a deployment signal if a predetermined activation event has been sensed.

In an exemplary embodiment, the inflator comprises a chamber 92 configured to contain pressurized gas. In one non-limiting example, the pressurized gas comprises a combination of helium and argon. It is of course recognized that the pressurized inflation gas may comprise one or more gasses as an alternative to or in addition to helium and argon non-limiting examples include carbon dioxide, nitrogen and mixtures thereof as well as any other gas providing the desired output.

In accordance with an exemplary embodiment inflator 30 may comprise any type of inflator, which produces gas to inflate the air bag cushion. Non-limiting examples of inflator 30 include any inflator known to one skilled in the related arts for example, one type is a pure gas inflator wherein a pressure vessel contains stored pressurized gas (described above). The pressure vessel communicates with the cushion through various types of rupturable outlets or diaphragms. Another type is a gas generator wherein a propellant is ignited and the resultant gas created flows through an outlet to the cushion. Still another type is the hybrid or augmented type. This type includes a pressure vessel containing stored pressurized gas and a gas generator. In the hybrid type the gas generator is ignited and the resultant gas flows with and heats the stored gas going to the cushion through the pressure vessel outlet.

Referring now to FIGS. 4-7 an exemplary embodiment includes a removable sealing member 90 positioned between chamber 92 and the inlet opening 56 of nozzle 54, the removable sealing member being configured to seal chamber 92 such that the pressurized gas contained by the chamber cannot escape via nozzle portion 54 unless a pre-determined activation event has been detected. In one exemplary embodiment, the removable sealing member is a burst disk configured to rupture when the pressurized gas exceeds a predetermined pressure within the chamber. FIGS. 4 and 7 depict the burst disk in a non-ruptured state (e.g., prior to an activation event). FIGS. 5 and 6 illustrate a non-limiting example of the burst disk in a ruptured state (e.g., during air bag inflation). The gas pressure increases in one non-limiting exemplary embodiment when an initiator 94 (FIG. 1) is activated consequent to an activation event. In one non-limiting embodiment initiator 94 is in electrical communication with a sensing and diagnostic module (not shown) that is configured to detect a predetermined activation event. The initiator may additionally or alternatively activate through direct or indirect communication with an activation event sensor.

Alternatively, and without intending to limit the function of initiator 94, the initiator may by configured to directly rupture sealing member 90 by puncturing or otherwise directly compromising the integrity of the sealing member. When the sealing member is removed or otherwise rendered ineffective as a seal, the pressurized gas escapes through the nozzle. As it escapes, the gas pushes against valve member 60. Initially, the force of the escaping pressurized gas is sufficient to substantially overcome the valve-closing force of biasing member 68. As the chamber empties of pressurized gas, the force of the biasing member gradually exceeds the force of the escaping gas against the head portion of the valve member, thereby closing the valve.

In another alternative exemplary embodiment, the initiator is combined with or enhanced by a pyrotechnic charge wherein this enhancement is integrated into the micro-gas generator or a separate assembly within chamber 92.

Referring now to FIGS. 8-10 yet another alternative exemplary embodiment is illustrated. Here, a variable venting assembly 150 comprises a nozzle portion 154 that is configured for securement to an inflator or is an integral portion of an inflator housing. The nozzle portion 154 has an inlet opening 156 and an outlet opening 158. The variable venting assembly further comprises a valve member 160 movably mounted to the nozzle for movement between a closed position (FIG. 8), an open position (FIG. 9), and a partially open position (FIG. 10). As illustrated, the valve member has a shaft member 162 and a head portion 164 secured to the shaft member. In accordance with an exemplary embodiment, the head portion is configured to seal the outlet opening when the valve member is in the closed position.

In accordance with an exemplary embodiment, a biasing member 168 is located between a portion 172 of the nozzle and a surface 170 of the shaft member. In an exemplary embodiment, the biasing member is configured to provide a biasing force in the direction of arrow 174 in order to maintain the valve member in the closed position. In accordance with an exemplary embodiment the biasing member is a helical spring having a larger end portion positioned adjacent the outlet end portion of the nozzle, and a smaller end portion positioned adjacent the surface 170 of the shaft member.

When the inflator disburses gas to an inflatable cushion, the biasing force of the biasing member is overcome by the force of pressurized gas pressing against valve member 160. A flow path is thereby created between outlet opening 158 and shaft member 162. In accordance with one exemplary embodiment, shaft member 162 has a tapered shaft portion 163 having varying-sized diameter for varying the size of the flow path at the nozzle outlet as the position of the valve member varies within the nozzle.

As illustrated in FIG. 9, and in accordance with an exemplary embodiment, the initial gas pressure is sufficient to substantially extend the valve member by pushing against the head portion. FIG. 10 illustrates that as gas pressure decreases, the valve member gradually returns to the closed position. The varying diameter of the shaft enables regulating of the gas pressure during different stages of gas disbursement through nozzle 154. For example, a narrow shaft diameter 163 (e.g., tapered portion) may provide a larger flow path than is provided by wider shaft diameter 163 (e.g., tapered portion), enabling a greater mass flow of the inflator gas.

Accordingly, the variable diameter shaft is positioned into an orifice within the gas flow region of the inflation system. The shaft may have multiple tapers and/or steps depending on performance requirements. Exemplary embodiments of the present invention are integrated into the manifold/nozzle of the inflator and/or adaptor to the inflator manifold/nozzle/module. Variable mass flow is accomplished by placing a pressure-regulated device in the gas flow, which adjusts the flow area of the gas as the pressure changes. Regulation of the mass flow during the deployment event allows for tailored performance of the module across the temperature ranges required in the vehicle.

As gas flow decreases, the biasing force of the biasing member gradually returns the valve member to a closed position. In accordance with an exemplary embodiment, a plurality of bleed orifices 180 provide fluid paths through the nozzle, the bleed orifices provide the fluid paths regardless of the position of the valve member, extending the period of inflation by permitting additional gas flow after the valve member returns to a closed position. Although only two orifices 180 are shown many variations are contemplated for example, the orifices may be positioned in a radial manner about the center of the head portion or a single orifice may be used.

When a predetermined activation event or occurrence is detected, the inflatable cushion is inflated by gas from the inflator. In general, the inflator will receive an inflation signal or deployment signal that causes the inflator to generate an inflation gas or inflation output for inflating the inflatable cushion. In the exemplary embodiments described above, the deployment signal is generated by a controller, such as a microcontroller of a sensing and diagnostic module configured for use with the air bag module. The sensing and diagnostic module receives a plurality of signals from appropriate sensing device (e.g., door mounted accelerometers), and will generate a deployment signal if a predetermined activation event has been sensed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A variable venting assembly for an inflator, the assembly comprising:
   a nozzle having an inlet opening and an outlet opening;
   a valve member movably mounted to the nozzle for movement between an open position and a closed position, the valve member having a shaft member and a head portion secured to the shaft member and an enlarged end portion secured to the shaft member remote from the head portion, the head portion being configured to seal the outlet opening when the valve member is in the closed position;
   a biasing member located between a portion of the nozzle and the enlarged end portion, the biasing member providing a biasing force to maintain the valve member in the closed position; and
   a bleed orifice providing a fluid path through the nozzle, the bleed orifice providing the fluid path regardless of the position of the valve member;
   wherein the shaft member is further configured to have a varying diameter which varies the size of a flow path through the outlet opening as the valve member moves between the open and closed positions.

2. The variable venting assembly as in claim 1, wherein the bleed orifice is an opening in the head portion, the opening being substantially smaller than the outlet opening.

3. The variable venting assembly as in claim 2, wherein the biasing member is a conical spring having a larger end portion positioned adjacent the head portion of the valve member.

4. The variable venting assembly as in claim 3, wherein the head portion is further configured to have a chamfered edge portion configured to be received within a complementary edge of the outlet opening when the valve member is in the closed position.

5. The variable venting assembly as in claim 1, wherein the bleed orifice is an opening in the nozzle, the opening being substantially smaller than the outlet opening.

6. The variable venting assembly as in claim 1, wherein the biasing member is a conical spring having a larger end portion positioned adjacent the head portion of the valve member.

7. The variable venting assembly as in claim 1, wherein the enlarged end portion comprises a surface facing the head portion, and wherein the biasing member engages the surface.

8. The variable venting assembly as in claim 1, wherein the head portion is further configured to have a chamfered edge portion configured to be received within a complementary edge of the outlet opening when the valve member is in the closed position.

9. The variable venting assembly as in claim 1, further comprising a plurality of bleed orifices each of which is an opening in the head portion and each opening being substantially smaller than the outlet opening.

10. The variable venting assembly as in claim 9, wherein the openings in the head portion are arranged in a radial manner with respect to a center of the head portion and wherein the biasing member is a helical spring having a larger end portion positioned adjacent the head portion of the valve member.

11. An inflator for an air bag module, comprising:
a housing defining a chamber for receiving a pressurized gas;
a variable venting assembly for releasing the pressurized gas from the housing, the variable venting assembly comprising:
a nozzle having an inlet opening and an outlet opening;
a valve member movably mounted to the nozzle for movement between an open position and a closed position, the valve member having a shaft member and a head portion secured to the shaft member and an enlarged end portion secured to the shaft member remote from the head portion, the head portion being configured to seal the outlet opening when the valve member is in the closed position;
a biasing member located between the outlet opening of the nozzle and the enlarged end portion, the biasing member providing a biasing force to maintain the valve member in the closed position;
a bleed orifice providing a fluid path through the nozzle, the bleed orifice providing the fluid path regardless of the position of the valve member;
a removable sealing member disposed between the chamber and the inlet opening; and
an initiator for removing the removable sealing member, wherein the pressurized gas moves the valve member from the closed position towards the open position;
wherein the shaft member is further configured to have a varying diameter which varies the size of a flow path through the outlet opening as the valve member moves between the open and closed positions.

12. The inflator as in claim 11, wherein the bleed orifice is an opening in the head portion, the opening being substantially smaller than the outlet opening.

13. The inflator as in claim 12, wherein the biasing member is a conical spring having a larger end portion positioned adjacent the outlet opening of the nozzle.

14. The inflator as in claim 13, wherein the head portion is further configured to have a chamfered edge portion configured to be received within a complementary edge of the outlet opening when the valve member is in the closed position.

15. The inflator as in claim 11, wherein the bleed orifice is an opening in the nozzle, the opening being substantially smaller than the outlet opening.

16. The inflator as in claim 11, wherein the biasing member is a conical spring having a larger end portion positioned adjacent the outlet opening of the nozzle.

17. The inflator as in claim 11, wherein the enlarged end portion comprises a surface facing the head portion, and wherein the biasing member engages the surface.

18. The inflator as in claim 11, wherein the head portion is further configured to have a chamfered edge portion configured to be received within a complementary edge of the outlet opening when the valve member is in the closed position.

19. The inflator as in claim 11, wherein the removable sealing member is a burst disk and wherein the pressurized gas is selected from the group comprising helium, argon, carbon dioxide, nitrogen and mixtures thereof.

20. The inflator as in claim 11, wherein the pressurized gas is a mixture of helium and argon.

21. A method for providing an extended inflation force to an inflatable cushion of an air bag module, the method comprising:
releasing a pressurized gas from a housing of an inflator with a variable venting assembly to inflate the inflatable cushion, the variable venting assembly releasing the pressurized gas at a first flow rate until a biasing force of a biasing member closes a valve member movably mounted to a nozzle of the inflator, said valve member further comprising a shaft member having a varying diameter, said pressurized gas being released through an outlet opening in the nozzle that cooperates with the valve member to define a flow path, said flow path having a size that varies as the valve member moves between an open position and a closed position; and
maintaining an inflation level of the inflatable cushion by providing a flow of inflation gas through a bleed orifice when the biasing member closes the valve member.

22. The method as in claim 21, wherein the maintaining step further includes providing the bleed orifice in a head portion of the valve member, the bleed orifice being substantially smaller than the outlet opening of the nozzle, and providing the flow of inflation gas through the bleed orifice at a flow rate less than the first flow rate, and the biasing member is a conical spring.

23. The method as in claim 22, wherein the releasing step further includes providing the head portion having a chamfered edge portion configured to be received within a complementary edge of the outlet opening when the valve member is in the closed position, and releasing said pressurized gas through the outlet opening between the chamfered edge portion and the complementary edge when the valve member is not in the closed position.

* * * * *